United States Patent
Chen et al.

(10) Patent No.: US 12,130,205 B2
(45) Date of Patent: Oct. 29, 2024

(54) DOUBLE-VACUUM FOUR-CAVITY HERMETICITY DETECTING METHODS AND MACHINES FOR SQUARE HOUSING BATTERIES

(71) Applicant: SHENZHEN UTIMES INTELLIGENT EQUIPMENT CO., LTD., Guangdong (CN)

(72) Inventors: Xi Chen, Shenzhen (CN); Yangdong Liu, Shenzhen (CN); Qiaobing Deng, Shenzhen (CN); Doudou Pei, Shenzhen (CN)

(73) Assignee: SHENZHEN UTIMES INTELLIGENT EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 18/437,275

(22) Filed: Feb. 9, 2024

(65) Prior Publication Data

US 2024/0183739 A1     Jun. 6, 2024

Related U.S. Application Data

(63) Continuation of application No. PCT/CN2023/093763, filed on May 12, 2023.

(30) Foreign Application Priority Data

Jul. 4, 2022   (CN) .......................... 202210776961.6

(51) Int. Cl.
*G01M 3/20* (2006.01)
*H01M 6/50* (2006.01)

(52) U.S. Cl.
CPC ........... *G01M 3/20* (2013.01); *H01M 6/5083* (2013.01)

(58) Field of Classification Search
CPC .............................. G01M 3/20; H01M 6/5083
See application file for complete search history.

(56) References Cited

U.S. PATENT DOCUMENTS

| | | | |
|---|---|---|---|
| 4,748,094 A | 5/1988 | Howard et al. | |
| 2001/0016278 A1* | 8/2001 | Onishi | H01M 10/4285 429/185 |
| 2008/0148819 A1* | 6/2008 | Sasaki | G01M 3/20 73/40.7 |

FOREIGN PATENT DOCUMENTS

| CN | 105327863 A | 2/2016 |
|---|---|---|
| CN | 106885656 A | 6/2017 |

(Continued)

OTHER PUBLICATIONS

First Office Action in Chinese Application No. 202210776961.6 mailed on Nov. 25, 2022, 15 pages.

(Continued)

*Primary Examiner* — David Z Huang
(74) *Attorney, Agent, or Firm* — Porus IP LLC (57) ABSTRACT

The present disclosure provides a double-vacuum four-cavity hermeticity detecting method and machine for a square housing battery. The method may include a loading device, four cavity devices, four cavity cover devices, four load transferring devices, two vacuum devices, a detecting device, and a discharging device, the cavity devices and the cavity cover devices may make a sealed cavity, and each of the vacuum devices predetermine two sealed cavities. While operating at the same time, four sealed cavities may be loaded for 8 s, vacuumed for 10 s and detected for a hermeticity for 5 s in a total of 15 s, and discharged for 8 s, a cycle time may be shortened to 8 s and a production period may be shortened to 32 s, and a productivity of a hermeticity detection may be improved to 15 PPM according to two batteries per cavity.

7 Claims, 6 Drawing Sheets

(56) References Cited

FOREIGN PATENT DOCUMENTS

| | | |
|---|---|---|
| CN | 207366147 U | 5/2018 |
| CN | 108237089 A | 7/2018 |
| CN | 108584359 A | 9/2018 |
| CN | 109406065 A | 3/2019 |
| CN | 209167511 U | 7/2019 |
| CN | 209802593 U | 12/2019 |
| CN | 112471247 A | 3/2021 |
| CN | 113210274 A | 8/2021 |
| CN | 216784870 U | 6/2022 |
| CN | 115096516 A | 9/2022 |
| JP | 2011179975 A | 9/2011 |

OTHER PUBLICATIONS

Decision to Grant a Patent in Chinese Application No. 202210776961.6 mailed on Feb. 24, 2023, 5 pages.
International Search Report in PCT/CN2023/093763 mailed on Aug. 6, 2023, 7 pages.
Written Opinion in PCT/CN2023/093763 mailed on Aug. 6, 2023, 8 pages.

\* cited by examiner

DOUBLE-VACUUM FOUR-CAVITY HERMETICITY DETECTING METHODS AND MACHINES FOR SQUARE HOUSING BATTERIES

CROSS-REFERENCE TO RELATED APPLICATION

The present disclosure is a Continuation of International Application No. PCT/CN2023/093763, filed on May 12, 2023, which claims priority to Chinese application No. 202210776961.6, filed Jul. 4, 2022, the entire contents of which are incorporated herein by reference.

TECHNICAL FIELD

The present disclosure belongs to a field of battery hermeticity detecting technology, and in particular, to a double-vacuum four-cavity hermeticity detecting method and machine for a square housing battery.

BACKGROUND

A primary battery (hereinafter referred to as a battery) for a square housing battery is a scaled container containing a cell and an anhydrous electrolyte. A Poor battery sealing performance tends to cause a leakage of the anhydrous electrolyte during a use of the battery, more seriously, water vapor may seep in, which may condense into water and enter into the anhydrous electrolyte, thereby destroying an insulation of an internal electrochemical system of the battery, a small amount of water may cause the battery to produce an abnormally high current caused by abnormal heat or even explosion and combustion in a charging process, the sealing performance of the battery may be related to a safety of the battery and a device using the device such as an electric car.

In a battery industry, through a hermeticity quantitative detection and a hermeticity leakage rate standard, a substandard product may be determined to screen out a battery with a relatively large leakage rate, which can ensure that the sealing performance of the used battery is qualified and the safety of the used battery.

SUMMARY

The embodiment of the present disclosure provides a double-vacuum four-cavity hermeticity detecting machine for a square housing battery, on the basis of an existing one-vacuum four-cavity hermeticity detecting machine, a vacuum devices is added, wherein the machine includes a loading device, four cavity device, four cavity cover devices, four load transferring devices, two vacuum devices, a detecting device and a discharging device, which are used for efficiently detecting a hermeticity for a square housing battery (hereinafter referred to as a battery);

for each cavity device of the four cavity devices, the cavity device includes a cavity for accommodating the battery;

the loading device is configured to load the battery into the four cavities sequentially;

for each cavity cover device of the four cavity cover devices, the cavity cover device is configured to close over the cavity to form a sealed cavity;

for each load transferring device of the four load transferring devices, the load transferring device is configured to load the cavity device and drive the cavity device to move between the loading device, the cavity cover device, and the discharging device;

for each vacuum device of the two vacuum devices, the vacuum device is configured to vacuum the sealed cavity and make the sealed cavity a vacuum cavity, the vacuum device includes a vacuum pump, a vacuum pipeline, and a vacuum baffle valve, the vacuum pump is fixed on the machine platform, the vacuum pump valve is fixed on the cavity cover device, and the vacuum pipeline connects the vacuum pump and the vacuum baffle valve;

the detecting device is configured to pump a vacuum gas in the vacuum cavity to perform leakage rate detecting of a tracer gas of battery sealing; the detecting device includes a detecting pump, a hermeticity detector, a detecting pipeline, a detecting baffle valve group, and a vacuum gauge; the detecting pump is fixed on the machine platform; the detecting vacuum baffle valve group is fixed on the cavity cover device for opening or closing the sealed cavity; the detecting pipeline connects the detecting baffle valve group and the detecting pump; the hermeticity detector is fixed on the detecting pipeline; the detecting pump is configured to pump the vacuum gas from the vacuum cavity into the hermeticity detector; the hermeticity detector is configured to detect a flow rate per unit of time of a tracer gas in the vacuum gas to obtain the leakage rate of the tracer gas of battery sealing; the vacuum gauge is fixed between the detecting baffle valve group and the cavity cover device for detecting a vacuum level inside the vacuum cavity.

the detecting baffle valve group includes three detecting baffle valves, a muffler, and a cleaning gas connector, wherein one of the three detecting baffle valves is configured to open or close a communication between the detecting baffle valve group and a sealed cavity where the detecting baffle valve group is located, the other of the three detecting baffle valves is configured to open or close a communication between the sealed cavity where the detecting baffle valve group is located and the cleaning gas connector, and the other of the three detecting baffle valves is configured to open or close a communication between the sealed cavity where the detecting baffle valve group is located and the muffler, the cleaning gas connector is configured to access a cleaning gas to remove the tracer gas from the sealed cavity; and the muffler is configured to exhale an air into the vacuum cavity or discharge the cleaning gas in the sealed cavity; and the discharging device is configured to discharge the battery from the four cavities sequentially, and a shape and configuration of the discharging device are the same as a shape and configuration of the loading device.

Further, the loading device includes a support, an X-direction drive module, an X-direction sliding support, a Z-direction drive module, a Z-direction sliding support, a drive member of a clamping jaw and a clamping jaw; the X-direction drive module is fixed on a top of the support, the X-direction sliding support is fixed on a power output end of the X-direction drive module; the Z-direction drive module is fixed on the X-direction sliding support, the drive member of the clamping jaw is fixed on a power output end of the Z-direction drive module, and the clamping jaw is fixed on a power output end of the drive member of the clamping jaw.

Further, the cavity device further includes a sealing ring, a cavity liner, wherein a cavity liner compartment is disposed inside the cavity liner for accommodating the battery, the scaling ring is disposed around an open edge of a top of the cavity, the scaling ring is configured to seal the cavity to the cavity cover, the cavity liner is fixed in the cavity, and the cavity liner compartment is located on the cavity liner.

Further, the cavity cover device includes a cavity cover support base plate, a cavity cover support column, a cavity cover, and a cavity cover top plate; and the cavity cover support base plate is fixed on the machine platform, a bottom end of the cavity cover support column is fixed at a corner position of the cavity cover support base plate, the cavity cover top plate is fixed at a top end of the cavity cover support column, and the cavity cover is fixed below the cavity cover top plate, the vacuum baffle valve and the detecting baffle valve group are fixed on the cavity cover top plate and communicate the cavity cover.

Further, the load transferring device includes a Y-direction drive module, a Y-direction drive module mounting plate, and a load transferring sliding support, the Y-direction drive module mounting plate is fixed on the machine platform, the Y-direction drive module is fixed on the Y-direction drive module mounting plate, the load transferring sliding support is fixed on a power output end of the Y-direction drive module, and the Y-direction drive module drives the load transferring sliding support to move between the loading device, the cavity cover device, and the discharging device along a Y-direction.

Further, the load transferring sliding support includes a load transferring sliding support base plate, a lifting and lowering drive member, a column, a sliding sleeve, a push plate, a baffle, and a material sensor;

the load transferring sliding support base plate is fixedly connected with the power output end of the drive module, the lifting and lowering drive member is fixed on the load transferring sliding support base plate, the column is fixed vertically on the load transferring sliding support base plate, the sliding sleeve is set on the column slidably, the push plate is fixedly connected with the sliding sleeve, a power output end of the lifting and lowering drive member is fixedly connected with the push plate, the baffle is fixed on a top of the column; the material sensor is fixed on the baffle, and the material sensor is configured to sense whether there is a battery in the cavity; and the cavity device is fixed with the push plate, and the lifting and lowering drive member drives the push plate to rise with the cavity device and make the cavity cover device cover the cavity device to form the sealed cavity.

To realize a purpose of the double-vacuum four-cavity hermeticity detecting method for a square housing battery, the present disclosure further provides a double-vacuum four-cavity hermeticity detecting method for a square housing battery, using a double-vacuum four-cavity hermeticity testing machine for a square-case battery, wherein a vacuum device that only opens to two predetermined sealed cavities is arranged based on a vacuum baffle valve.

Further, four load transferring devices and four cavity cover devices make four cavity devices located in a loading working station, a vacuuming working station, a hermeticity detecting working station, and a discharging working station, respectively in sequence, and a loading device, two vacuum devices, a detecting device, and a discharging device operate simultaneously;

the loading device is configured to load a battery to four cavities sequentially;

at the same time, one of the two vacuum devices vacuums a first sealed cavity to make the first sealed cavity a first vacuum cavity, and then turns to vacuum a second sealed cavity to make the second sealed cavity a second vacuum cavity;

at the same time, the other of the two vacuum devices vacuums a third sealed cavity to make the third sealed cavity a third vacuum cavity, and then turns to vacuum a fourth sealed cavity to make the fourth sealed cavity a fourth vacuum cavity, and then turns back to vacuum the third sealed cavity;

at the same time, the first vacuum cavity, the second vacuum cavity, the third vacuum cavity, and the fourth vacuum cavity are detected for a hermeticity by the detecting device; and at the same time, the discharging device discharges the battery from the four cavities in sequence.

BRIEF DESCRIPTION OF THE DRAWINGS

The present disclosure is further describable in terms of exemplary embodiments. These exemplary embodiments are describable in detail with reference to the drawings. These embodiments are non-limiting exemplary embodiments, in which like reference numerals represent similar structures throughout the several views of the drawings, and wherein.

The reference signs in accompanying drawings are presented below.

10—battery, 100—machine platform,
200—loading device, 210—support, 220—X-direction drive module, 230—X-direction sliding support, 240—Z-direction drive module, 250—Z-direction sliding support, 260—drive member of a clamping jaw, 270—clamping jaw,
300—cavity device, 310—cavity, 320—sealing ring, 330—cavity liner, 331—cavity liner compartment, 332—elastic member,
400—cavity cover device, 410—cavity cover support base plate, 420—cavity cover support column, 430—cavity cover, 440—cavity cover top plate,
500—load transferring device, 510—Y—direction drive module, 520—Y—direction drive module mounting plate, 530—load transferring sliding support, 531—load transferring sliding support base plate, 532—lifting and lowering drive member, 533—column, 534—sliding sleeve, 535—push plate, 536—baffle, 537—material sensor,
600—vacuum device, 610—vacuum pump, 620—vacuum pipeline, 630—vacuum baffle valve,
700—detecting device, 710—detecting pump, 720—hermeticity detector, 730—detecting pipeline, 740—detecting baffle valve group, 741—detecting baffle valve, 742—muffler, 743—cleaning gas connector, 750—vacuum gauge,
800—discharging device.

DETAILED DESCRIPTION

In order to make the objects, technical solutions, and advantages of the present disclosure clearer and more understandable, the present disclosure is hereinafter described in further detail in conjunction with the accompanying drawings and embodiments. It should be understood that the specific embodiments described herein are only for explaining the present disclosure, and are not intended to limit the present disclosure.

In the description of the present disclosure, it is to be noted that the terms "center," "up," "down," "left," "right," "front," "back," "vertical," "horizontal," "inside," "outside," etc. indicate orientations or positional relationships based on those shown in the accompanying drawings, and are intended only for the purpose of facilitating the description of the present disclosure and simplifying the description, and are not intended to indicate or imply that the device or element referred to must be constructed and operated with a particular orientation, and are not to be construed as a limitation of the present disclosure; the terms "first," "second,", and "third" are used for descriptive purposes only and are not to be understood as indicative or suggestive of relative importance; furthermore, the terms "mounting," "connecting," "connected" are to be understood in a broader sense unless otherwise expressly provided and qualified, e.g., as a fixed connection, a removable connection, or a connection in one piece, as a direct connection, as an indirect connection through an intermediate medium, or as a connection within two parts. For those of ordinary skill in the art, the specific meaning of the above terms in the present disclosure may be understood in specific contexts.

Figure 1:
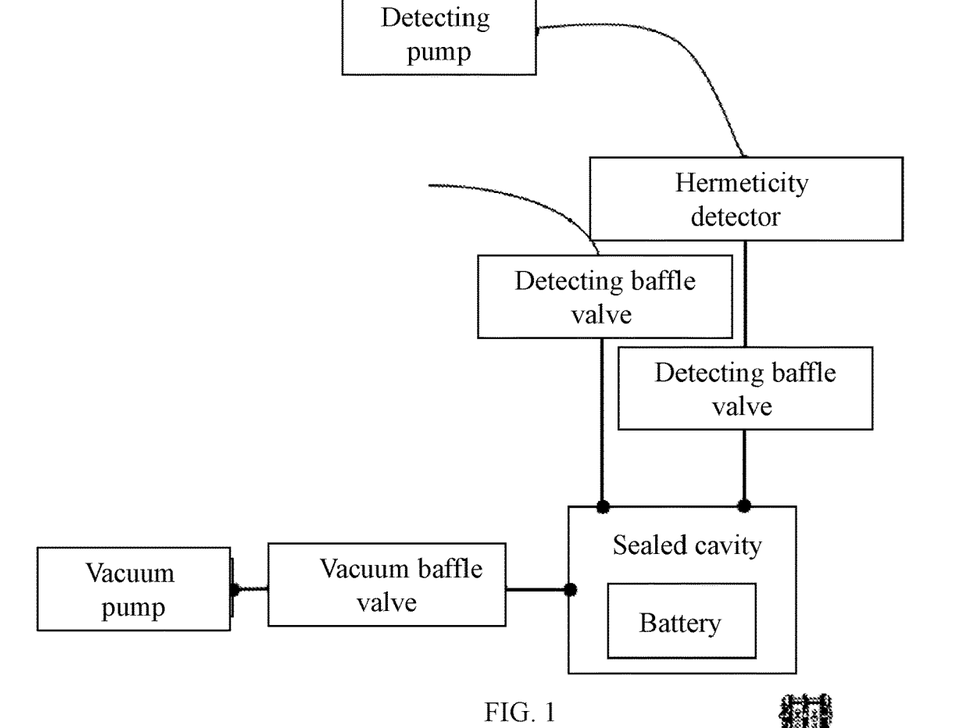
FIG. 1 is a schematic diagram illustrating an exemplary principle of hermeticity detecting of a square housing battery.

A sealing performance of a square aluminum-housing lithium battery needs to be detected after welding a top cover and a sealing nail cover of the battery. As shown in FIG. 1, the industry may generally use a tracer gas charged into the battery, and place a battery filled with the tracer gas in a sealed cavity and make the sealed cavity a vacuum cavity by vacuuming the sealed cavity using a vacuum pump, an air pressure difference between inside and outside the battery may make the tracer gas leak outward to the vacuum cavity through possible welds, cracks, holes, slag, or the like, then use a detecting pump to connect with the vacuum cavity through a hermeticity detecting machine to extract the tracer gas, after a certain period of time, a flow rate of the tracer gas per unit time pumped away by the vacuum pump from the vacuum cavity may be the same as a flow rate of the tracer gas per unit time leaked to the vacuum cavity, i.e., a leakage rate of the tracer gas of the battery, and at this time, the flow rate of the tracer gas per unit time detected and pumped away by the hermeticity detecting machine is a detected leakage rate of the tracer gas, referred to as a balance of the detected gas and the leakage gas.

In the vacuum cavity, detecting the leakage by filling the square housing battery with the tracer gas before welding the sealing nail cover of the battery may be referred to be as a pre-hermeticity detection; and in the vacuum cavity, detecting the leakage by using a pre-scaled tracer gas inside the square housing battery after welding the sealing nail cover of the battery may be referred to be as a post-hermeticity detection. The post-hermeticity detection generally may include four processes: loading, vacuuming, hermeticity detecting, and discharging, and the shorter the four processes with consistent cycle times, the higher a capacity of the device.

A hermeticity detecting machine in the existing technology may be a one-vacuum four-cavity hermeticity detecting machine, which adopts a vacuum device with a vacuum pump, and a loading device, four cavity devices, four cavity cover devices, four load transferring devices, a detecting device, and a discharging device, and the four cavity devices may operate at the same time, which the four cavity devices may be loaded for 8 s, vacuumed for 10 s, detected for a hermeticity for 5 s, and discharged for 8 s sequentially, a cycle time may be 10 s, and a production period may be 40 s; a productivity of hermeticity detecting may be 12 PPM according to two batteries per cavity, so it can be seen that each functional device in the hermeticity detecting machine in the existing technology has been fully utilized, and the productivity of the hermeticity detecting can not be further improved.

Figure 2:
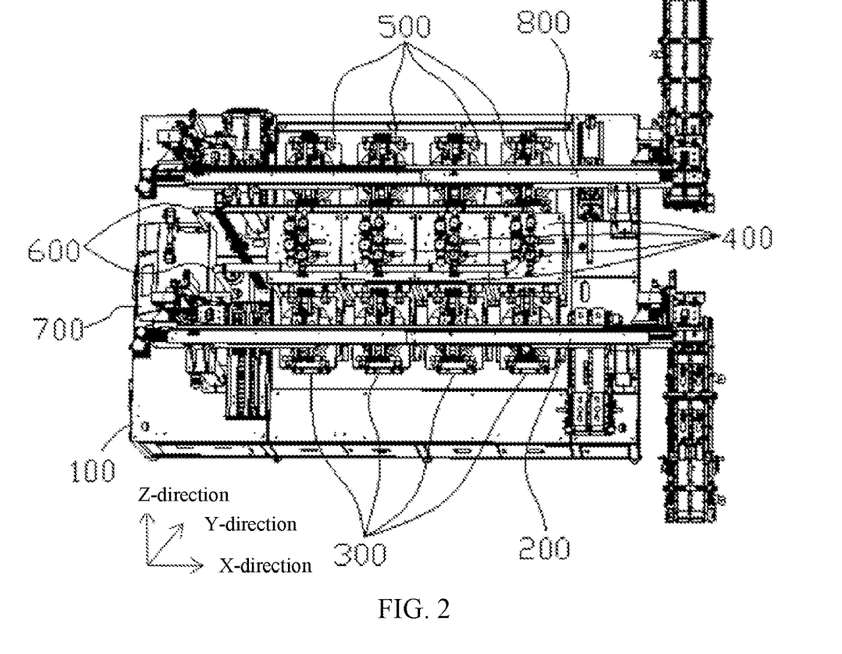
FIG. 2 is a schematic diagram illustrating an exemplary working station layout of a double-vacuum four-cavity hermeticity detecting machine for a square housing battery according to some embodiments of the present disclosure.

Referring to FIG. 2, FIG. 2 provides a double-vacuum four-cavity hermeticity detecting machine for a square housing battery in this embodiment, including a machine platform 100, a loading device 200, four cavity devices 300, four cavity cover devices 400, four transferring devices 500, two vacuum devices 600, a detecting device 700, and a discharging device 800 that are fixed to the machine platform 100 for efficiently detecting a hermeticity of a square housing battery (hereinafter referred to as a battery).

Figure 3:
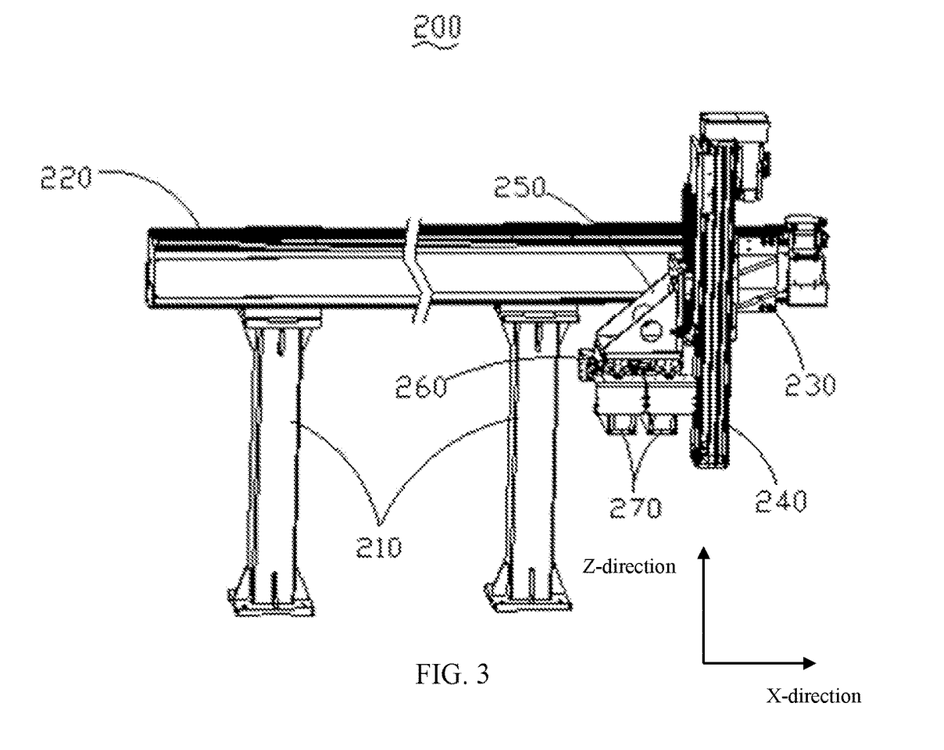
FIG. 3 is a schematic diagram illustrating an exemplary structure of a loading device in the double-vacuum four-cavity hermeticity detecting machine for a square housing battery shown in FIG. 2.

Referring to FIG. 3 and a direction sign, the loading device 200 may include a support 210, an X-direction drive module 220, an X-direction sliding support 230, a Z-direction drive module 240, a Z-direction sliding support 250, a drive member of a clamping jaw 260, and a clamping jaw 270. The support 210 may be fixed to the machine platform 100, the X-direction drive module 220 may be fixed to a top of the support 210, and the X-direction sliding support 230 may be fixed to a power output end of the X-direction drive module 220, the Z-direction drive module 240 may be fixed to the X-direction sliding support 230, the driver member of the clamping jaw 260 may be fixed to a power output end of the Z-direction drive module 240, and the clamping jaw 270 may be fixed to a power output end of the drive member of the clamping jaw 260. The support 210 may be configured to support other components of the loading device 200, the X-direction sliding support 230 may be configured to connect the X-direction drive module 220 and the Z-direction drive module 240, and the X-direction drive module 220 may drive the Z-direction drive module 240 to perform a linear reciprocating movement along an X-axis direction. The Z-direction sliding module 250 may be configured to connect the Z-direction drive module 240 and the drive member of the clamping jaw 260, the drive member of the clamping jaw 260 may be fixed on the power output end of the Z-direction drive module 240 through the Z-direction sliding support 250. The Z-direction drive module 240 may drive the driver member of the clamping jaw 260 to perform the linear reciprocating movement along a Z-axis direction, and the drive member of the clamping jaw 260 may drive the clamping jaw 270 to hold or release a battery 10. The loading device 200 may be configured to load the battery 10 into cavities 310 of the four cavity devices 300 in sequence.

Figure 4:
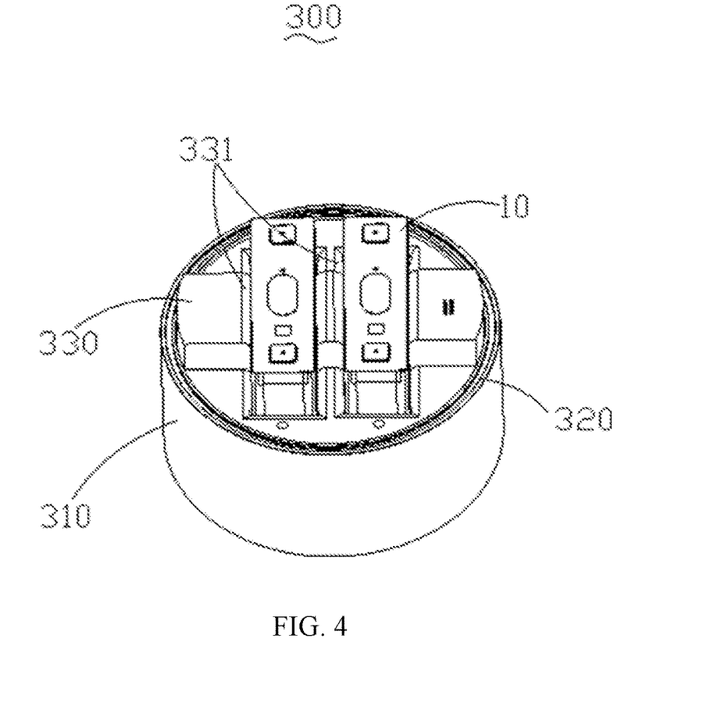
FIG. 4 is a schematic diagram illustrating an exemplary structure of a cavity device in the double-vacuum four-cavity hermeticity detecting machine for a square housing battery shown in FIG. 2.

Referring to FIG. 4, the cavity device 300 may include the cavity 310 for accommodating the square housing battery 10, a sealing ring 320, a cavity liner 330 disposed in the cavity 310, the cavity liner 330 may include two cavity liner compartments 331, wherein the two cavity liner compartments 331 may accommodate two batteries 10. The sealing ring 320 may be disposed around an open edge of a top of the cavity 310, and the sealing ring 320 may be used to seal the cavity 310 and a cavity cover device 400. A material of the sealing ring 320 may include but is not limited to rubber, silicone, or the like.

The cavity liner compartment 331 refers to a groove structure disposed on the cavity liner 330 for accommodating and arranging the battery 10. In some embodiments, a count of cavity liner compartments 331 may not be limited, and a specific count may be determined according to an actual situation of a size of the battery 10 and a capacity demand. In some embodiments, a structural shape of the cavity liner compartment 331 may be a regular or irregular shape such as a rectangular shape, and a specific structural shape and dimensions may be determined by a shape and dimension of an outer contour of the battery 10.

Figure 11:
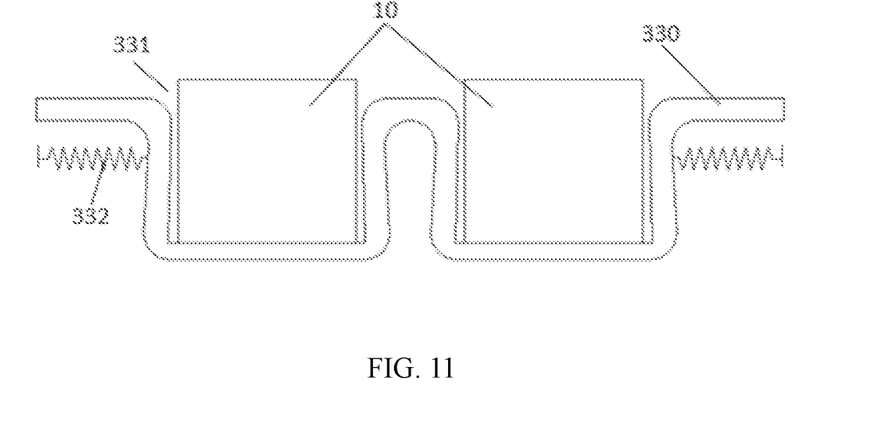
FIG. 11 is a schematic diagram illustrating an exemplary structure of a cavity liner.

In some embodiments, the cavity liner 330 may be made of an elastic material. Exemplary elastic materials may include elastomeric plastics, thin metal sheets, or the like. As shown in FIG. 11, the cavity liner cavity 331 may be a U-shaped structure with a small opening and a large bottom end. Elastic members 332 may be connected with two sides of the cavity liner 330, and the elastic members 332 may be capable of pressing two sides of the battery 10 disposed in the cavity liner compartment 331 to maintain a position of the battery 10 relative to the cavity device 300 unchanged. The elastic member 332 refers to a member having elasticity, for example, the elastic member 332 may include but is not limited to a spring, or the like. In some embodiments, one end of the elastic member 332 may be coupled to the cavity liner 330, and another end of the elastic member 332 may be coupled to an inner wall of the cavity 310.

In some embodiments, when the battery 10 is placed in the cavity liner compartment 331, the elastic member 332 may be compressed, at which time a resilience generated by the elastic member 332 may cause the cavity liner 330 disposed on the two sides of the battery 10 to form a compression on the battery 10 to secure the battery 10, thereby causing the position of the battery 10 relative to the cavity device 300 to remain unchanged. It may be appreciated that by utilizing an elasticity of the elastic member 332, it is possible to enable batteries 10 with different sizes and dimensions to be stabilized and fixed in the cavity liner compartment 331, thereby improving a compatibility of the hermeticity detecting machine.

In some embodiments, the two sides of the cavity liners 330 may also be provided with other structures or components to perform a similar function as the elastic member 332.

In some embodiments, the two sides of the cavity liner 330 may be coupled with a linear drive member (not shown in the figures), the linear drive member may be capable of determining an amount of drive based on a distribution of pressure sensing data to press the two sides of the battery 10 disposed in the cavity liner compartment 331, thereby maintaining the position of the battery 10 relative to the cavity device 300 unchanged.

The linear drive member may be a member that enables a linear expansion and contraction, such as a cylinder. The amount of drive may be an amount of expansion and contraction of the linear drive member.

In some embodiments, the amount of drive may be obtained from a vector database by vector matching. Merely for example, the vector database may include a plurality of sets of reference vectors, each reference vector in the plurality of sets of reference vectors may correspond to a reference amount of drive. The reference vector may be constructed based on a distribution of pressure sensing data in historical data, and the reference amount of drive corresponding to the reference vector may be an amount of drive corresponding to a distribution of pressure sensing data. A vector to be matched may be constructed based on a distribution of current pressure sensing data. A processor may calculate a distance between each reference vector and the vector to be matched, respectively, and determine a reference amount corresponding to a reference vector whose distance with the vector to be matched satisfies a preset distance condition as an amount of drive of the vector to be matched, i.e., an amount of drive corresponding to the distribution of the current pressure sensing data. The preset condition may be set according to an actual situation. For example, the preset condition may be a vector distance being minimized or the vector distance being less than a distance threshold, or the like.

It should be noted that the linear drive member may determine the amount of drive based on the distribution of pressure sensing data in other ways, such as based on a first preset table. More descriptions of the processor and the distribution of pressure sensing data may be found in later descriptions.

Figure 5:
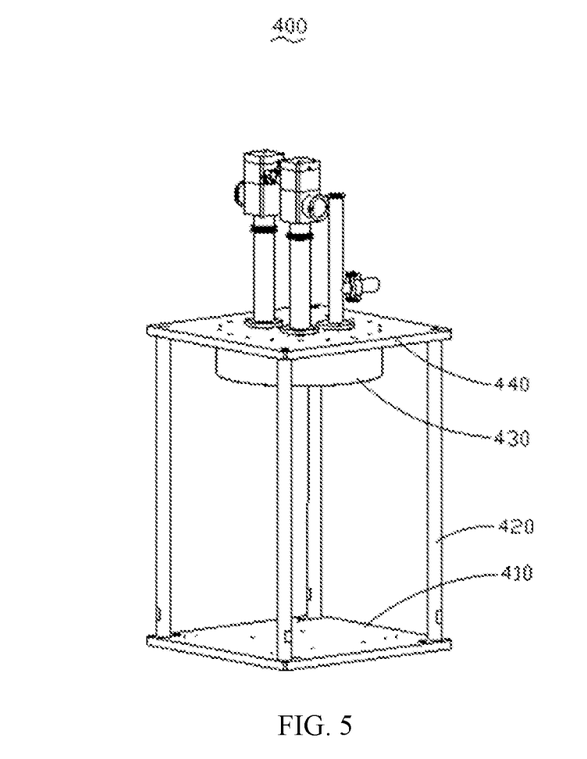
FIG. 5 is a schematic diagram illustrating an exemplary structure of a cavity cover device in the double-vacuum four-cavity hermeticity detecting machine for a square housing battery shown in FIG. 2.

Referring to FIG. 5, the cavity cover device 400 may include a cavity cover support base plate 410, four cavity cover support columns 420, a cavity cover 430, and a cavity cover top plate 440. The cavity cover support base plate 410 may be fixed to the machine platform 100, and bottom ends of the cavity cover support columns 420 may be fixed at corner positions of the cavity cover support base plate 410. The cavity cover top plate 440 may be fixed to a top end of the cavity cover support columns 420, and the cavity cover 430 may be fixed below the cavity cover top plate 440.

The cavity cover support base plate 410 refers to an element for fixing the cavity cover support column 420. A cross-sectional shape of the cavity cover support base plate 410 may include but is not limited to circular, rectangular, or the like. A connection manner of the cavity cover support base plate 410 and the machine 100 may include a threaded connection or a snap connection. In some embodiments, the cavity cover support base plate 410 may also be a part of the machine platform 100, and the bottom ends of the cavity cover support columns 420 may be fixed directly to the machine platform 100.

The cavity cover support column 420 refers to an element arranged on the cavity cover support base plate 410 for supporting and securing the cavity cover support top plate 440. Similarly, a cross-sectional shape of the cavity cover support column 420 may include but is not limited to, a circular shape, a rectangular shape, or the like. A count of the cavity cover support columns 420 may be a plurality, and the plurality of cavity cover support columns 410 may be disposed on the cavity cover support base plate 410. In some embodiments, the count of the cavity cover support columns 420 may be related to a cross-sectional shape of the cavity cover support base plate 410. For example, when the cross-sectional shape of the cavity cover support base plate 410 is rectangular, the count of the cavity cover support columns 420 is four, and the four cavity cover support columns 420 may be disposed at four corner positions of the cavity cover support base plate 410, respectively.

The cavity cover 430 refers to an element for covering the cavity 310. In some embodiments, the cavity cover 430 may be fixed below the cavity cover top plate 440, i.e., the cavity cover 430 may be fixed on a side of the cavity cover top plate 440 that is oriented toward the cavity cover support base plate 410. The cavity cover 430 may be arranged in correspondence with the cavity 310, and the cavity 310 may be located below the cavity cover 430 and may be capped to form a sealed cavity. The cavity cover top plate 440 refers to an element for fixing the cavity cover 430, the vacuum baffle valve 630, and the detecting baffle valve group 740.

Figure 6:
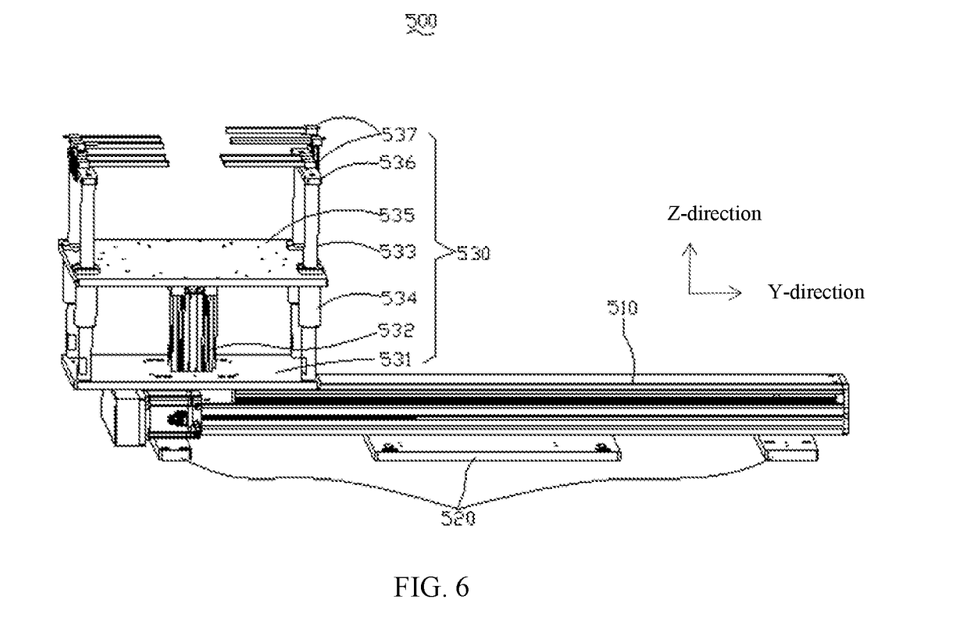
FIG. 6 is a schematic diagram illustrating an exemplary structure of a load transferring device in the double-vacuum four-cavity hermeticity detecting machine for a square housing battery shown in FIG. 2.

Referring to FIG. 6 and a direction sign, the load transferring device 500 may include a Y-direction drive module 510, a Y-direction drive module mounting plate 520, and a load transferring sliding support 530. The Y-direction drive module mounting plate 520 may be fixed on the machine platform 100, the Y-direction drive module 510 may be fixed on the Y-direction drive module mounting plate 520, and the load transferring sliding support 530 may be fixed on a power output end of the Y-direction drive module 510, and the Y-direction drive module 510 may drive the load transferring sliding support 530 to move along the Y-direction between the loading device 200, the cavity cover device 400, and the discharging device 800.

The Y-direction drive module 510 refers to a member used to drive the load transferring sliding support 530. In some embodiments, the Y-direction drive module 510 may be constructed in a variety of configurations to fulfill a function of driving the load transferring sliding support 530. The exemplary Y-direction drive module 510 may include a linear module and a cylinder.

The Y-direction drive module mounting plate 520 refers to an element for mounting the Y-direction drive module 510. In some embodiments, the Y-direction drive module mounting plate 520 may be of an integral structure or a split structure, for example, the Y-direction drive module mounting plate 520 may include a plurality of sub-mounting plates disposed respectively at a plurality of positions to form the Y-direction drive module mounting plate 520. In some embodiments, the Y-direction drive module mounting plate 520 may also be a part of the machine platform 100, wherein the Y-direction drive module 510 may be fixed directly on the machine platform 100.

The load transferring sliding support 530 refers to a support capable of moving along an extended direction of the Y-direction drive module 510. In some embodiments, the load transferring sliding support 530 may include a load transferring sliding support base plate 531, a lifting and lowering drive member 532, a column 533, a sliding sleeve 534, a push plate 535, a baffle 536, and a material sensor 537.

The load transferring sliding support base plate 531 refers to an element for fixing the lifting and lowering drive member 532 and the column 533. A cross-sectional shape of the load transferring sliding support base plate 531 may include but is not limited to circular, rectangular, or the like. A connection manner of the load transferring sliding support base plate 531 and the Y-direction drive module 510 may include a threaded connection and a snap connection.

The lifting and lowering drive member 532 refers to a member for driving the push plate 535 up and down. The exemplary lifting and lowering drive member 532 may include but are not limited to a cylinder.

The column 533 refers to an element for guiding the push plate 535 and fixing the baffle 536. It should be noted that a cross-sectional shape and an arranging manner of the column 533 are similar to the cross-sectional shape and arranging manner of the cavity cover support column 420, which may not be repeated here.

The sliding sleeve 534 refers to an element arranged between the push plate 535 and the column 534 that facilitates the push plate 535 to slide up and down along the column 535. In some embodiments, the sliding sleeve 534 may be fixedly connected with the push plate 535 and slidingly connected with the column 533 to enable the push plate 535 to slide up and down along the column 533 under an action of the lifting and lowering drive member 532.

The push plate 535 refers to an element for fixing the cavity device 300. In some embodiments, a cross-sectional shape of the push plate 535 may or may not be the same as the cross-sectional shape of the load transferring sliding support base plate 531. In some embodiments, the push plate 535 may be correspondingly provided with holes for fixing the sliding sleeve 534.

The baffle 536 refers to an element for coupling the column 533 and fixing the material sensor 537. In some embodiments, the baffle 536 may be provided at top ends of two neighboring columns 533 and is fixedly coupled to the top ends of the two neighboring columns 533.

The material sensor 537 refers to an element for detecting whether there is battery 10 in the cavity 310. The exemplary material sensor 537 may include an infrared sensor and an ultrasonic sensor. It should be noted that the material sensor 537 may be fixed at any feasible position on the baffle 536 that is sufficient to detect the battery 10 in the cavity 310.

In some embodiments, the load transferring sliding support base plate 531 is fixedly connected with the power output end of the Y-direction drive module 510, the lifting and lowering drive member 532 may be is fixed to the load transferring sliding support base plate 531, the column 533 may be fixed vertically to the load transferring sliding support base plate 531, the sliding sleeve 534 may be set on the columns 533 slidably, the push plate 535 may be fixedly connected with the sliding sleeve 534, a power output end of the lifting and lowering drive member 532 may be fixedly connected with the push plate 535, and the baffle 536 may be fixed on a top of the column 533. The material sensor 537 may be fixed on the baffle 536, and the material sensor 537 may be used to sense whether there is battery 10 in the cavity 310.

Figure 7:
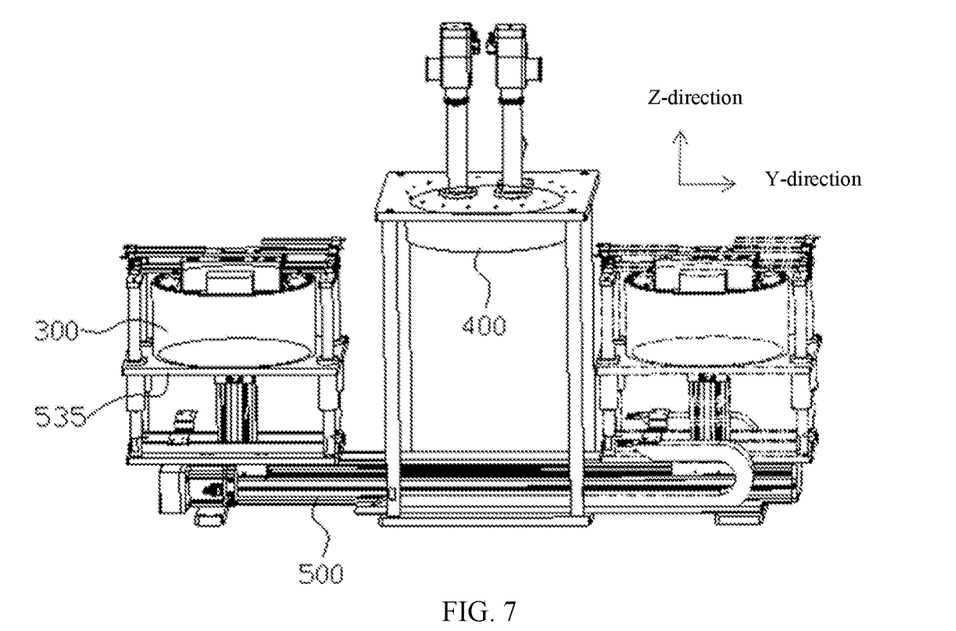
FIG. 7 is a schematic diagram illustrating an exemplary structure of a cavity device, a cavity cover device, and the load transferring device in the double-vacuum four-cavity hermeticity detecting machine for a square housing battery shown in FIG. 2.

Referring to FIG. 7 and a direction sign, the cavity device 300 may be fixed to the push plate 535, and when the material sensor 537 detect there is a battery 10 in the cavity 310, the lifting and lowering drive member 332 may drive the push plate 535 to rise and make the cavity cover device 400 cover the cavity device 300 to form a sealed cavity.

Figure 8:
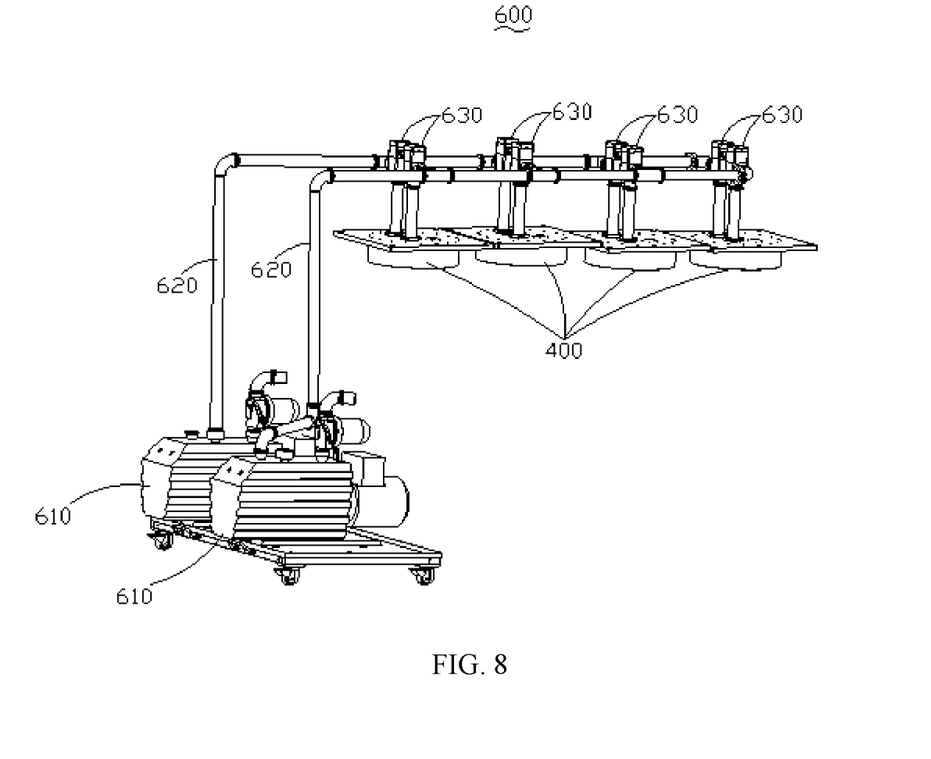
FIG. 8 is a schematic diagram illustrating an exemplary structure of a vacuum device in the double-vacuum four-cavity hermeticity detecting machine for a square housing battery shown in FIG. 2.

Referring to FIG. 8, the vacuum device 600 may include a vacuum pump 610, a vacuum pipeline 620, and a vacuum baffle valve 630. The vacuum pump 610 may be fixed to the machine platform 100, the vacuum baffle valve 630 may be fixed on the cavity cover device 400, the vacuum pipeline 620 may connect the vacuum pump 610 and the vacuum baffle valves 630, and the vacuum baffle valve may be configured to open or close the vacuum pipeline 620. The vacuum pump 610 may be capable of vacuuming the sealed cavity under the condition that the vacuum pipeline 620 are open.

Figure 9:
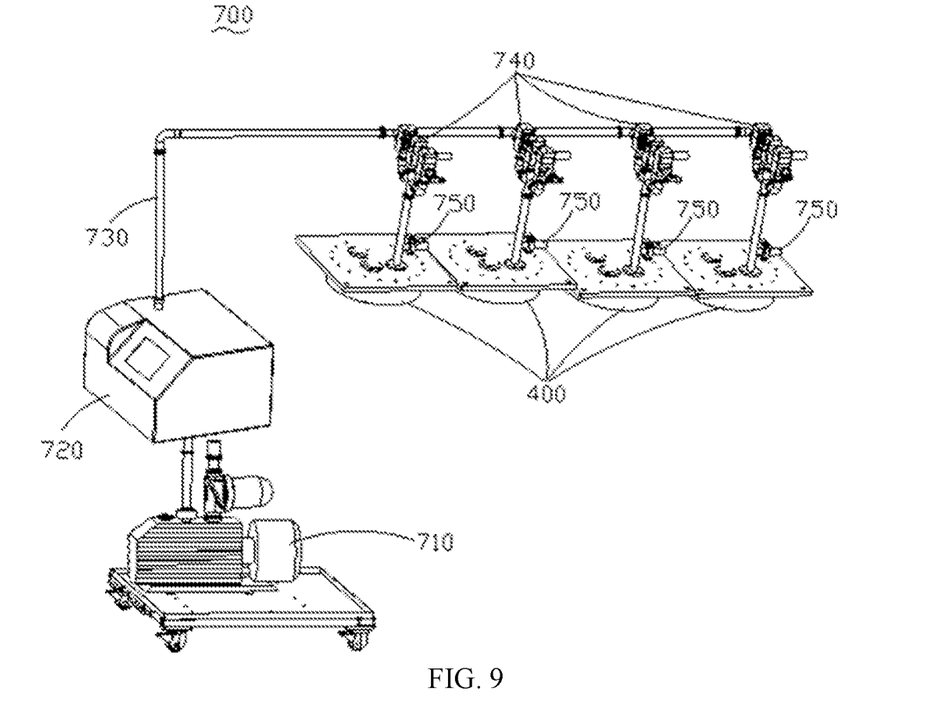
FIG. 9 is a schematic diagram illustrating an exemplary structure of a detecting device in the double-vacuum four-cavity hermeticity detecting machine for a square housing battery shown in FIG. 2.

The detecting device 700 may be used to extract a vacuum gas from a vacuum cavity for detecting a tracer gas of battery sealing. Referring to FIGS. 1 and 9, the detecting device 700 may include a detecting pump 710, a hermeticity detector 720, a detecting pipeline 730, a detecting baffle valve group 740, and a vacuum gauge 750. The detecting pump 710 may be fixed on the machine platform 100; the detecting vacuum baffle valve group 740 may be fixed on the cavity cover device 400 for opening or closing the detecting pipeline 730; the detecting pipeline may connect the detecting baffle valve group 740 and the detecting pump 710; the hermeticity detector 720 may be fixed on the detecting pipeline 730, the detecting pump 710 may be used to pump a vacuum gas in the vacuum cavity into the hermeticity detector 720, and the hermeticity detector 720 may be used to detect a flow rate per unit of time of a tracer gas in the vacuum gas to obtain a leakage rate of the tracer gas of battery sealing; and the vacuum gauge 750 may be fixed between the detecting baffle valve group 740 and the cavity cover device 400 for detecting a vacuum level inside the vacuum cavity.

Figure 10:
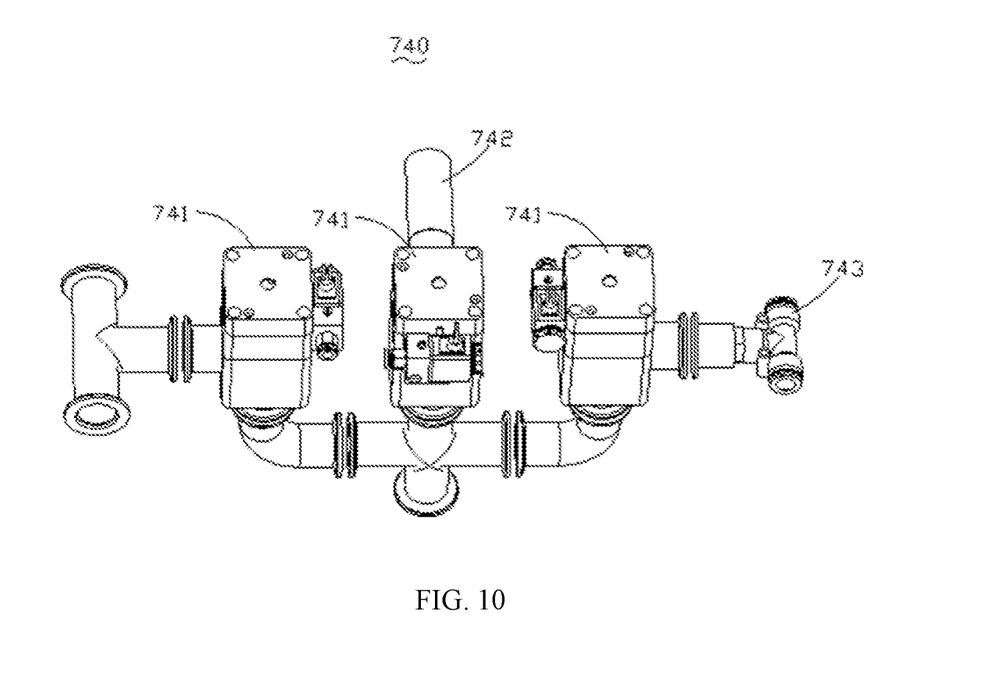
FIG. 10 is a schematic diagram illustrating an exemplary structure of a detecting baffle valve group in the detecting device shown in FIG. 9.

Specifically, referring to FIG. 10, the detecting baffle valve group 740 may include three detecting baffle valves 741, a muffler 742, and a cleaning gas connector 743, one of the three detecting baffle valve 741 may be used to open or close a communication between a sealed cavity where the detecting baffle valve 740 is located and the detecting pipeline 730, the other of the three detecting baffle valves 741 may be used to open or close a connection between a sealed cavity where the detecting baffle valve 740 is located and the cleaning gas connector 743, and the other of the three detecting baffle valves 741 may be used to open or close a connection between a scaled cavity where the detecting baffle valve 740 is located and the muffler 742, the cleaning gas connector 743 may be used to access a cleaning gas to remove the tracer gas from the sealed cavity; and the muffler 742 may be used to exhale an air into the vacuum cavity or discharge the cleaning gas in the sealed cavity, thereby reducing whistling when exhaling an air into the vacuum cavity or discharging the cleaning gas in the scaled cavity.

The discharging device 800 may be used to discharge the battery 10 after detecting from the cavity 310 of the four cavity devices 300 in sequence, and a shape and configuration of the discharging device 800 may be the same as that of the loading device 200.

The embodiments of the present disclosure also provide a double-vacuum four-cavity hermeticity detecting method for a square housing battery which uses the above-described double-vacuum four-cavity hermeticity detecting machine for a square housing battery, and two scaled cavities may be provided for each of the two vacuum devices 600, and a vacuum device 600 that only opens to two predetermined sealed cavities may be set through the vacuum baffle valve 630.

In some embodiments, four load transferring devices and four cavity cover devices may make four cavity devices located in a loading working station, a vacuuming working station, a hermeticity detecting working station, and a discharging working station, respectively in sequence, and a loading device 200, two vacuum devices 600, a detecting device 700, and a discharging device 800 may operate simultaneously; the loading device 200 may be configured to load the battery 10 to four cavities 310 sequentially; at the same time, one of the two vacuum devices 600 may vacuum a first sealed cavity to make the first sealed cavity a first vacuum cavity, and then turn to vacuum a second sealed cavity to make the second sealed cavity a second vacuum cavity; at the same time, the other of the two vacuum devices 600 may vacuum a third scaled cavity to make the third scaled cavity a third vacuum cavity, and then turn to vacuum a fourth sealed cavity to make the fourth sealed cavity a fourth vacuum cavity, and then turn back to vacuum the third sealed cavity; at the same time, the first vacuum cavity, the second vacuum cavity, the third vacuum cavity, and the fourth vacuum cavity may be detected for a hermeticity by the detecting device 700; and at the same time, the discharging device 800 may discharge the battery 10 from the four cavities 310 in sequence.

In one embodiment, the four cavities may be numbered as 1 #, 2 #, 3 #, and 4 # cavities in order; the two vacuum devices 600 may be numbered as a series-1 vacuum device and a series-2 vacuum device, the series-1 vacuum device may be set only open to the 1 # cavity and the 3 # cavity through the vacuum baffle valve 630, and the series-2 vacuum device may be set only open to the 2 # cavity and the 4 # cavity through the vacuum baffle valves 630, a configuration thereof may be referred to a Table 1:

Furthermore, four transferring devices 500 and four cavity cover devices 400 may make four cavity devices 300 located in a loading working station, a vacuuming working station, a hermeticity detecting working station, and a discharging working station, respectively in sequence, and the loading device 200, the vacuum device 600, the detecting device 700, and the discharging device 800 may operate simultaneously, a process flow thereof may be referred to the Table 1:

The loading device 200 may sequentially load the battery 10 into 1 #, 4 #, 3 # and 2 # cavities;
- at the same time, the series-1 vacuum device 600 may vacuum the 2 # cavity to make the 2 # cavity a vacuum cavity, and then vacuum the 4 # cavity to make the 4 # cavity a vacuum cavity;
- at the same time, the series-2 vacuum device 600 may vacuum the 3 # cavity to make the 3 # cavity a vacuum cavity, and vacuum the 1 # cavity to make the 1 # cavity a vacuum cavity, and then turn back to vacuum the 3 # cavity;
- at the same time, the detecting device 700 may perform a hermeticity detection on the 3 # cavity, the 2 # cavity, the 1 # cavity, and the 4 # cavity in sequence;
- at the same time, the discharging device 800 may discharge the battery 10 from the 4 # cavity, the 3 # cavity, the 2 # cavity, and the 1 # cavity in sequence.

TABLE 1

Configuration and process flow of a double-vacuum four-cavity hermeticity detecting method for a square housing battery

| Period(s) | 1# cavity | 2# cavity | 3# cavity | 4# cavity |
|---|---|---|---|---|
| 0~8 | Loading for 8 s | Series-1 vacuuming for 8 s | Series-2 continuing to vacuum for 2 s and performing a hermeticity detection for 5 s | Discharging for 8 s |
| 8~16 | Series-2 vacuuming for 8 s | Series-1 continuing to vacuum for 8 s and performing a hermeticity detection for 5 s | Discharging for 8 s | Loading for 8 s |
| 16~24 | Series-2 continuing to vacuum for 8 s and performing a hermeticity detection for 5 s | Discharging for 8 s | Loading for 8 s | Series-1 turning to vacuum for 8 s |
| 24~32 | Discharging for 8 s | Loading for 8 s | Series-2 turning to vacuum for 8 s | Series-1 continuing to vacuum for 2 s and performing a hermeticity detection for 5 s |

The loading, vacuuming, hermeticity detecting, and discharging may operate simultaneously, and the four cavities may be loaded, vacuumed, detected for a hermeticity, and discharged in sequence, so that a production period and cycle time can be shortened. In one embodiment, the four cavities 310 may be sequentially loaded for 8 s, vacuumed for 10 s, and then detected for a hermeticity 5 s in a total of 15 s, and discharged for 8 s, which a cycle time may be reduced to 8 s and a production period may be shortened to 32 s; and a productivity of the hermeticity detection may be increased to 15 PPM according to the two batteries per cavity. Therefore, it can be seen that this embodiment shortens the cycle time of four processes of the hermeticity detection of the battery 10 and improves the productivity of the hermeticity detection.

In embodiments of the present disclosure, a smallest vacuum system composed by a pump with a sealed cavity structure is provided, after being contaminated by a tracer gas leaked from a detected battery in the sealed cavity, it is only necessary to clean the cavity 310, the sealing ring 320, the cavity liner 330, the cavity cover 430, the vacuum baffle valve 630, the detecting pipeline 730, the detecting baffle valve 741, and the vacuum gauge 750 involved in the cavity until an environment of the tracer gas is restored, thereby minimizing a downtime losses caused by the cleaning.

In some embodiments, a plurality of pressure sensors (not shown in the figures) may be provided on each of the cavity liner compartments 331, and the double-vacuum four-cavity hermeticity detecting machine for a square housing battery may further include a processor (not shown in the figures), the processor may be configured to determine a distribution of the pressure sensing data based on the plurality of pressure sensors on the each of the cavity liner cavities 331 in the first cavity device 300, determine a distribution of the pressure sensing data based on pressure sensing data collected by the plurality of pressure sensors on the each of the cavity liner compartments 331 in a first cavity device 300; and determine whether to perform a subsequent adjustment operation based on the distribution of the pressure sensing data.

The processor may process information and/or data obtained from other devices or one or more components of the hermeticity detecting machine described above. The processor may execute program instructions based on such data, information, and/or processing results to perform one or more of the functions described in the present disclosure. In some embodiments, the processor may include one or more sub-processing devices (e.g., a single-core processing device or a multi-core processing device). Merely for example, the processor may include a central processing unit (CPU), a specialized integrated circuit (ASIC), etc., or any combination thereof.

The pressure sensor may be used to detect a pressure applied at a plurality of different positions of the cavity liner compartments 331. The exemplary pressure sensor may include a piezoresistive pressure sensor and a capacitive pressure sensor. In some embodiments, the plurality of pressure sensors may be evenly distributed across each cavity liner compartment 331. In some embodiments, the plurality of pressure sensors may also be disposed at a predetermined position on each of the cavity liner compartments 331.

The pressure sensing data may reflect information about the pressure being applied at a position wherein the pressure sensor is located on the cavity liner compartments 331. In some embodiments, the processor may obtain the pressure sensing data in real-time from the plurality of pressure sensors. The distribution of the pressure sensing data may reflect a distribution of pressure on the cavity liner compartments 331. In some embodiments, the distribution of the pressure sensing data may be reflected as serial data. The processor may arrange the pressure sensing data in a preset rule to determine the distribution of the pressure sensing data. The preset rule may include arranging the plurality of pressure sensors based on a numbering sequence of the plurality of pressure sensors, or the like. Merely for example, a user (e.g., an operator) may number the plurality of pressure sensors based on the distribution of the plurality of pressure sensors on the cavity liner compartments 331.

The processor may arrange the pressure sensing data based on the numbering sequence of the plurality of pressure sensors to determine the distribution of the pressure sensing data.

An adjustment operation may be an operation related to adjusting each preset process or procedure of the hermeticity detecting. In some embodiments, the adjustment operation may include increasing a pumping power of the vacuum pump 610 when vacuuming a first cavity device. The first cavity device refers to a cavity device 300 that is currently loaded and to be vacuumed. The pumping power may reflect a pumping speed and pumping efficiency of the vacuum pump 610. The higher the pumping power is, the faster the pumping speed of the vacuum pump 610 is and the higher the pumping efficiency is.

Based on the distribution of the pressure sensing data, the processor may determine whether to perform the subsequent adjustment operation in a variety of ways. The exemplary way may include vector matching, algorithmic modeling, or the like.

In some embodiments, based on the distribution of the pressure sensing data, the processor may determine whether to perform the subsequent adjustment operation by using a second preset table. The second preset table may reflect a correspondence between the distribution of the pressure sensing data and whether to perform the subsequent adjustment operation and a specific adjustment value. In some embodiments, the second preset table may be constructed based on historical data. Merely for example, when no adjustment operation is required and a process flow runs stably, "whether to perform a subsequent adjustment operation" corresponding to the distribution of pressure sensing data in the historical data may be recorded as "No"; and when each process runs stably after performing the adjustment operation, "whether to perform a subsequent adjustment operation" corresponding to the distribution of pressure sensing data in the historical data may be recorded as "Yes, a specific adjustment value", wherein the specific adjustment value may be determined according to an actual adjustment value when the adjustment operation is performed. It is to be understood that, based on the distribution of the pressure sensing data, the processor may determine, using the second preset table, whether to increase the pumping power of the vacuum pump 610 for vacuuming the first cavity device and an adjustment value of the pumping power.

In some embodiments, the vacuum pump 610 may typically operate at a preset pumping power to save energy. The preset pumping power may be a pumping power that enables a vacuum level inside the cavity device 300 to satisfy a vacuum level requirement within a predetermined time. The vacuum level requirement refers to a requirement that may satisfy a vacuum level required for the hermeticity detecting, which may be determined based on an actual demand. However, due to a difference in the batteries 10 placed in the cavity liner compartments 331 (e.g., differences in dimensions of the batteries or differences in placement positions, etc.), a structure of an internal space of the cavity device 300 may not always be constant. Therefore, when vacuuming a certain cavity device 300 with a structure of internal space that is different from a standard space structure significantly, the vacuum pump 610 operating at the preset pumping power may result in insufficient vacuum for the vacuum level inside the cavity device 300 to satisfy the vacuum level requirement within a preset time. Based on this, by appropriately increasing the pumping power of the vacuum pump 610 to eliminate the above problem, the effectiveness of the vacuum pump 610 can be ensured, which in turn ensures the effectiveness of the hermeticity detecting. In some embodiments, when the vacuum pump 610 completes the vacuuming, the pumping power of the vacuum pump 610 may revert to the preset pumping power to save energy and avoid wasting resources.

In some embodiments, the processor may determine, based on the distribution of the pressure sensing data, a predicted leakage detecting time of the first cavity device using a prediction model; and in response to the predicted leakage detecting time satisfying a preset condition, determine an adjustment value of the pumping power of the vacuum pump 610 based on a difference value between the predicted leakage detecting time and a standard leakage detecting time.

The prediction model refers to a model for predicting a predicted leakage detecting time for the first cavity device. In some embodiments, the prediction model may be a machine learning model. For example, the prediction model may include a Deep Neural Networks (DNN) model, or the like.

In some embodiments, an input to the prediction model may include the distribution of the pressure sensing data, and an output of the prediction model may include the predicted leakage detecting time of the first cavity device. The predicted leakage detecting time may be a time that the vacuum pump 610 to vacuum the first cavity device at a certain pumping power (e.g., a pumping power A) until the vacuum level inside the first cavity device satisfies the vacuum level requirement.

In some embodiments, the prediction model may be obtained by training a large number of training samples with labels. The training samples may include a sample distribution of pressure sensing data, and the label may include an actual leakage detecting time of a first cavity device corresponding to the distribution of the sample pressure sensing data. In some embodiments, the training samples may be determined based on the historical data, and the label may be obtained based on manual labeling, or the like.

In some embodiments, the training samples may be input into an initial prediction model, and the initial prediction model may be updated iteratively through training until a trained model satisfies a preset training condition, and the trained prediction model may be obtained. The preset training condition may be that a loss function is less than a threshold, converges, or a training period reaches a threshold. In some embodiments, a manner of iteratively updating parameters of the model may include a conventional model training manner such as a stochastic gradient manner.

In some embodiments of the present disclosure, by processing the distribution of the pressure sensing data using the trained prediction model, the predicted leakage detecting time of the first cavity device can be determined more accurately and quickly, and thus can provide a basis for determining the adjustment value of the pumping power of the vacuum pump 610.

The preset condition may be a condition set in advance to determine the predicted leakage detecting time. For example, the preset condition may be that the predicted leakage detecting time is greater than the standard leakage detecting time, or the like. The standard leakage detecting time may be a time that the vacuum pump 610 to vacuum a standard spatial structure at the same pumping power (e.g., the pumping power A) until a vacuum level inside the standard spatial structure satisfies the vacuum level requirement.

In some embodiments, when the predicted leakage detecting time satisfies the preset condition, the processor may determine an adjustment value of the pumping power of the vacuum pump 610 based on the difference value between the predicted leakage detecting time and the standard leakage detecting time. The greater the difference value between the predicted leakage detecting time and the standard leakage detecting time, the greater the adjustment value of the pumping power of the vacuum pump 610.

In some embodiments, one or more temperature sensors may be provided in the cavity device 300, and a plurality of temperature sensors may be provided at a plurality of different positions in the cavity device 300. The plurality of temperature sensors may be used to collect temperature data of gas in the cavity device 300 at a plurality of different positions. The exemplary temperature sensor may be an air temperature sensor, or the like.

In some embodiments, the input of the prediction model may further include temperature data at one or more positions in the first cavity device. The training samples of the prediction model may further include temperature data at one or more position in a sample first cavity device.

In some embodiments, since the temperature may affect a flow of the gas in the cavity device 300, thus affecting the effectiveness of the vacuum pump 610 when vacuuming the first cavity device, it is useful to use the temperature data at one or more position in the first cavity device as the input of the model when determining the predicted leakage detecting time of the first cavity device, which is beneficial to further improve the prediction accuracy of the model.

The foregoing is only a preferred embodiment of the present disclosure and is not intended to limit the present disclosure, and any modifications, equivalent substitutions, improvements, etc., made within the spirit and principles of the present disclosure shall be included in the scope of protection of the present disclosure.

What is claimed is:

1. A double-vacuum four-cavity hermeticity detecting machine for square housing batteries, used for efficiently detecting a hermeticity of the square housing battery or batteries, comprises a machine platform, wherein the machine platform further comprises a loading device, four cavity devices, four cavity cover devices, four load transferring devices, two vacuum devices, a detecting device, and a discharging device;

the loading device is configured to load the battery or batteries into the four cavities sequentially;

for each cavity device of the four cavity devices, the each cavity device includes a cavity for accommodating battery or batteries;

for each cavity cover device of the four cavity cover devices, the cavity cover device is configured to close over one singular corresponding cavity device to form a sealed cavity, respectively;

for each load transferring device of the four load transferring devices, the each load transferring device is configured to load one singular corresponding cavity device of the four cavity devices and drive the cavity device to move between the loading device, the predetermined cavity cover device, and the discharging device;

for each vacuum device of the two vacuum devices, the vacuum device is configured to connect with the four cavity cover devices and can vacuum the connected sealed cavity or cavities to make the sealed cavity or cavities vacuum cavity or cavities; the two vacuum devices are configured to parallelly connect with the four cavity cover devices; the each vacuum device including a vacuum pump, a vacuum pipeline, and four vacuum baffle valves, the vacuum pump is fixed on the machine platform, the vacuum pipeline connects the vacuum pump and the four vacuum baffle valves, each of the four vacuum baffle valves is fixed on the singular corresponding cavity cover device, and is configured to open or close communication between a sealed cavity and the vacuum pipeline;

the detecting device is configured to pump a vacuum gas in the vacuum cavity to perform hermeticity leakage rate detecting of a tracer gas which comes from the inside of the battery or batteries in the vacuum cavity and can show a hermeticity leakage rate of the battery or batteries; the detecting device including a detecting pump, a hermeticity detector, a detecting pipeline, four detecting baffle valve groups, and four vacuum gauges; the detecting pump is fixed on the machine platform; each of the four detecting vacuum baffle valve groups is fixed on the singular corresponding cavity cover device for opening or closing the vacuum cavity; the detecting pipeline connects the four detecting baffle valve groups and the detecting pump; the hermeticity detector is fixed on the detecting pipeline between the four detecting baffle valve groups and the detecting pump; the detecting pump is configured to pump the vacuum gas from one vacuum cavity into the hermeticity detector; the hermeticity detector is configured to detect a flow rate per unit of time of the tracer gas in the vacuum gas to obtain the leakage rate of the tracer gas of the battery or batteries in the vacuum cavity; each of the four vacuum gauge is fixed between the singular corresponding detecting baffle valve group and the cavity cover device for detecting a vacuum level inside the vacuum cavity;

the detecting baffle valve group includes three detecting baffle valves, a muffler, and a cleaning gas connector, wherein one of the three detecting baffle valves is configured to open or close a communication between a sealed cavity and the detecting pipeline, the other of the three detecting baffle valves is configured to open or close a communication between the sealed cavity and the cleaning gas connector, and the any other of the three detecting baffle valves is configured to open or close a communication between the sealed cavity and the muffler, the cleaning gas connector is configured to access a cleaning gas to remove the tracer gas from the sealed cavity; and the muffler is configured to exhale air into the vacuum cavity or discharge the cleaning gas in the sealed cavity; and the discharging device is configured to discharge the battery or batteries from the four cavities sequentially.

2. The double-vacuum four-cavity hermeticity detecting machine for square housing batteries of claim 1, wherein the loading device includes a support, an X-direction drive module, an X-direction sliding support, a Z-direction drive module, a Z-direction sliding support, a driver of a clamping jaw and a clamping jaw; the X-direction drive module is fixed on a top of the support, the X-direction sliding support is fixed on a power output end of the X-direction drive module; the Z-direction drive module is fixed on the X-direction sliding support, the driver of the clamping jaw is fixed on a power output end of the Z-direction drive module, and the clamping jaw is fixed on a power output end of the driver of the clamping jaw.

3. The double-vacuum four-cavity hermeticity detecting machine for square housing batteries of claim 1, wherein the each cavity device further includes a sealing ring, a cavity liner, wherein a cavity liner compartment is disposed inside the cavity liner for accommodating the battery, the sealing ring is disposed around an open edge of a top of the cavity, the sealing ring is configured to seal the cavity to the cavity cover, the cavity liner is fixed in the cavity, and the cavity liner compartment is located on the cavity liner.

4. The double-vacuum four-cavity hermeticity detecting machine for square housing batteries of claim 1, wherein the each cavity cover device includes a cavity cover support base plate, a cavity cover support column, a cavity cover, and a cavity cover top plate; and the cavity cover support base plate is fixed on the machine platform, a bottom end of the cavity cover support column is fixed at a corner position of the cavity cover support base plate, the cavity cover top plate is fixed at a top end of the cavity cover support column, and the cavity cover is fixed below the cavity cover top plate, the vacuum baffle valve and the detecting baffle valve group are fixed on the cavity cover top plate and communicate with the cavity cover.

5. The double-vacuum four-cavity hermeticity detecting machine for square housing batteries of claim 1, wherein the each load transferring device includes a Y-direction drive module, a Y-direction drive module mounting plate, and a load transferring sliding support, the Y-direction drive module mounting plate is fixed on the machine platform, the Y-direction drive module is fixed on the Y-direction drive module mounting plate, the load transferring sliding support is fixed on a power output end of the Y-direction drive module, and the Y-direction drive module drives the load transferring sliding support to move between the loading device, the cavity cover device, and the discharging device along a Y-direction.

6. The double-vacuum four-cavity hermeticity detecting machine for square housing batteries of claim 5, wherein the each load transferring sliding support includes a load transferring sliding support base plate, a lifting and lowering driver, a column, a sliding sleeve, a push plate, a baffle, and a material sensor;

the load transferring sliding support base plate is fixedly connected with the power output end of the drive module, the lifting and lowering driver is fixed on the load transferring sliding support base plate, the column is fixed vertically on the load transferring sliding support base plate, the sliding sleeve is set on the column slidably, the push plate is fixedly connected with the sliding sleeve, a power output end of the lifting and lowering driver is fixedly connected with the push plate, the baffle is fixed on a top of the column; the material sensor is fixed on the baffle, and the material sensor is configured to sense whether there is a battery in the cavity; and for the each cavity device of the four cavity devices, the each cavity device is fixed with the singular corresponding push plate, and the singular corresponding lifting and lowering driver drives the push plate to rise with the cavity device and make the predetermined cavity cover device cover the cavity device to form the sealed cavity.

7. A double-vacuum four-cavity hermeticity detecting method for a square housing battery, using a double-vacuum four-cavity hermeticity testing machine for a square-case battery of claim 1, wherein one vacuum device that only opens to two predetermined sealed cavities is arranged by alternately opening two vacuum baffle valves; four load transferring devices and four cavity cover devices make four cavity devices located in a loading working station, a vacuuming working station, a hermeticity detecting working station, and a discharging working station, respectively in sequence, and a loading device, two vacuum devices, a detecting device, and a discharging device operate simultaneously;

the loading device is configured to load battery or batteries to four cavities sequentially;

at the same time, one of the two vacuum devices vacuums a first sealed cavity to make the first sealed cavity a first vacuum cavity, and then turns to vacuum a second sealed cavity to make the second sealed cavity a second vacuum cavity;

at the same time, the other of the two vacuum devices vacuums a third sealed cavity to make the third sealed cavity a third vacuum cavity, and then turns to vacuum a fourth sealed cavity to make the fourth sealed cavity a fourth vacuum cavity, and then turns back to vacuum the third sealed cavity;

at the same time, the first vacuum cavity, the second vacuum cavity, the third vacuum cavity, and the fourth vacuum cavity are detected for a hermeticity by the detecting device in sequence; and at the same time, the discharging device discharges the battery or batteries from the four cavities in sequence.

* * * * *